United States Patent
Mathiesen

(10) Patent No.: US 6,896,761 B1
(45) Date of Patent: May 24, 2005

(54) METHOD OF MANUFACTURING A COMPOSITE MATERIAL

(75) Inventor: Benny Martin Mathiesen, Middelfart (DK)

(73) Assignee: KE-Burgmann A/S, Vejen (DK)

(*) Notice: Subject to any disclaimer, the term of this patent is extended or adjusted under 35 U.S.C. 154(b) by 0 days.

(21) Appl. No.: 09/485,097

(22) PCT Filed: Aug. 8, 1998

(86) PCT No.: PCT/DK98/00342

§ 371 (c)(1),
(2), (4) Date: Mar. 8, 2000

(87) PCT Pub. No.: WO99/07551

PCT Pub. Date: Feb. 18, 1999

(30) Foreign Application Priority Data

Aug. 6, 1997 (DK) ...................... 910/97

(51) Int. Cl.⁷ .................................. C09J 5/00

(52) U.S. Cl. .................. 156/324; 156/308.2

(58) Field of Search ............. 156/311, 312, 308.2, 156/309.6, 324; 442/289

(56) References Cited

U.S. PATENT DOCUMENTS 2,833,686 A * 5/1958 Sandt .................. 156/311

FOREIGN PATENT DOCUMENTS

| DE | 4202920 | * | 8/1993 |
| EP | 0 159 942 | | 4/1985 |
| EP | 0 711 657 | | 10/1995 |
| GB | 1451824 | | 3/1974 |
| JP | 52-6782 | * | 1/1977 |
| JP | 61-61849 | * | 3/1986 |
| WO | WO90/08651 | | 8/1990 |
| WO | WO92/09429 | | 6/1992 |

* cited by examiner

Primary Examiner—Jeff H. Aftergut
Assistant Examiner—John L. Goff
(74) Attorney, Agent, or Firm—Merchant & Gould P.C.

(57) ABSTRACT

The invention relates to a method of manufacture of a composite product including at least one layer of reinforced woven material and at least one layer of PTFE foil or ePTFE foil, where the foil or foils are laminated together with the layer or layers of woven material under the use of heating and pressurizing, where the composite material subsequently is cooled to a fully or partly fixed state. According to a preferred embodiment the composite is fixated by means of one or two cooperating pressure surfaces under a relative high pressure. By the invention a form stable composite material having a considerable enhanced E-modulus is achieved.

9 Claims, 1 Drawing Sheet

METHOD OF MANUFACTURING A COMPOSITE MATERIAL

FIELD OF THE INVENTION

The invention relates to a method of manufacture of a composite material having at least one layer of reinforced woven material and at least one layer of PTFE foil or ePTFE foil, a composite product having at least one layer of reinforced woven material and at least one layer of PTFE foil or ePTFE foil, and an apparatus for manufacture of a composite material having at least one layer of reinforcing woven material and at least one layer of PTFE foil or ePTFE foil.

BACKGROUND OF THE INVENTION

Composite products comprising a reinforcing woven material and a PTFE foil are used for many different industrial purposes. Within the chemical industry, this kind of material is, for example, used for vessels, compensators, containers, conveyor belts and chemical barriers. Such objects must be able to resist strong chemical and thermal impacts. This is also a consideration within power plants, the food industry and many other applications where reliable and strong mechanical and/or chemical properties are also important.

In a composite material, like those discussed above, interactions between materials in the composite will create the properties that make the composite material suitable for a given application. Typically, the woven material will improve the mechanical properties during a thermal impact whilst the applied PTFE foil or foils will provide barrier properties that may be maintained even under high temperatures.

However, it has proven difficult to obtain a proper "balance" between the individual components of the composite material during its manufacture. This is because a composite product typically shrinks during the manufacturing, so that the final composite product displays significantly different dimensions than those of the original laminated product. This can be a particular problem in the manufacture of composite products with pre-determined final dimensions, because there is a tendency for the composite product, especially the edge regions, to bend or wrinkle.

Apart from the problem of the composite shrinking or otherwise becoming disfigured, it can also be difficult to predict the dimensions of the final product. This can make further machining after lamination necessary. Further machining is often not possible to automate and can result in material waste.

A composite product such as the above can shrink up top 10%. In such a situation, the amount of material wasted can be a significant factor in the final production price of such composites.

One way of improving the manufacturing process is by adding an extra layer of coating during lamination of the woven material and the PTFE coils. This solution however makes the manufacturing process more expensive, results in an increased use of material, and results in a finished composite material with an increased thickness and weight.

SUMMARY OF THE INVENTION

Using a method of the invention which includes cooling the composite material subsequent to a fully or partly fixed state, a composite material with an improved form stability, reduced shrinkage and an enhanced E-modulus is obtained.

By reducing the shrinkage of the PTFE layer of the composite, a better form stability for the product as a whole is obtained, since the woven material typically is very sensitive to shrinkage by lamination with a foil.

The main purpose of the invention, to obtain an improved form stability, is thus a very important factor in the precision production of composite products, conduit linings, compensators, conveyor belts, tank liners, containers or similar applications, where a poor form stability results in a finished product that has substantial and indeterminate shrinkage.

Composite materials of the invention, for use in chemical plants, can be combined with form stable components with known dimensions, since it can be tremendously difficult to predict the dimensions of the finished composite product.

A fixation of the composite could, for example, be carried out by expanding the composite in a frame, and then cooling the composite by the use of a gas or a liquid. It is preferred to let the cooling take place as quickly as possible after the heating.

As used herein, a reinforcing woven material includes glass fibre fabric, PTFE fabric, PTFE coated glass fibre fabric or other materials. However it is preferred in many applications to use glass fibre fabric. As used herein, ePTFE foil means an expanded PTFE foil.

According to the invention, full or part fixation of the composite during the cooling, makes it possible to regulate or control the shrinkage of the finished product. This is of major importance in relation to products where high dimensional requirements are desired in the final product. Part of the cooling process can, for example, be carried out in a fixed state, whilst another part of the cooling process can be carried out in a non-fixed state.

It is understood that the invention can be carried out as a sub-process of a total process, since it is possible to manufacture a composite material with one added layer of foil and fabric, so that a multi-layered composite material can be manufactured by laminating one layer to the composite material at a later time.

The composite material and methods of making it also offer a significant advantage because the finished composite material exhibits a significantly reduced shrinkage relative to the added foils and fabrics, which means that the utilization degree can be enhanced by at least 10%.

Moreover, a major trimming of the edge regions can be avoided, whereby the waste of material is reduced.

In another embodiment, the cooling is carried out over a period of time of approximately 0.1 to 240 seconds from a temperature of 300 to 420° C. to a temperature of about 50° C. Such an embodiment offers an advantageous and practical embodiment of the invention.

It is preferred for many of the material thicknesses used, that the time period is approximately 20 to 120 seconds from a temperature of 380 to 400° C. to a temperature of about 50° C.

It is understood that the time and cooling process is very dependent on the thickness and the properties of the individual components.

It should be emphasized that the cooling can be done rather quickly, whereby the combined cooling and fixation is very attractive in connection with automatic and continuous manufacturing processes.

It is further understood that improved results can be achieved by performing a cooling, according to the invention, over a part of a temperature interval. It is also understood that the best result, however, will be achieved when cooling over the whole temperature interval, i.e. from a given high temperature to a wanted end temperature.

In yet another embodiment, the composite material can be subjected to a tension during the cooling. Such an embodiment provides an advantageous embodiment of the invention.

In a further embodiment, the composite material undergoes a combined cooling and pressure operation by means of pressure application. This embodiment provides an advantageous embodiment of the invention since the means for pressure application fixates the composite material during the cooling, which results in a solid improvement of the form stability. Specifically, a particularly high E-modulus can be achieved in the final composite product, just as a good form stability is achievable. This means, for instance, that the shrinkage of a composite material manufactured according to the invention will be significantly reduced. In certain types of products the shrinkage can be reduced by a factor of 10–15 and the E-modulus can be enhanced by a factor of 5.

The achieved fixation by means of a pressure supply also means that the composite can be cooled during application of a very high pressure, causing the composite to be fixated in a controlled manner during the entire cooling. This high cooling pressure causes the form of the composite to be maintained in its final shape during the cooling, and also causes the cooling to take place much more quickly across the surface. Improved contact between the means for pressure supply and the composite thus leads to an improved mutual heat transport, whereby the cooling of the composite can be accelerated.

In yet a further embodiment, the means for pressure supply is provided with cooling means. This embodiment provides another particularly advantageous embodiment of the invention, since it has been discovered that this combined cooling and pressure application results in an optimal result with respect to the produced composite materials. Because first, a product with improved shrinkage properties is achieved, and second, the product can be produced with relatively uncomplicated control.

As mentioned above, an improved contact between the means for pressure supply and the composite results in an improved mutual heat transfer whereby the cooling of the composite can be accelerated.

In another embodiment, the pressure supply is provided continuously by means for pressure supply comprising at least one roller. Such an embodiment provides a commercially advantageous possibility of providing continuous production of a composite material that is form stable and/or has a high E-modulus.

The production can further be carried out at relatively high speeds.

In a further embodiment, the pressure supply is provided intermittently by means of a pressure supply comprising a pressure surface. Such an embodiment provides particular advantages, as the pressure supply applied by a pressure plate can be completely controlled in the sense that any supplementary tension in the foils or the surface direction of the composite in many applications can be totally avoided.

The pressure can be provided by controlling only one parameter, i.e. the pressure provided by the means for pressure supply. By using this pressure surface the diffusion properties the uncontrollable influences of the simultaneous tension in the foils or the composite can be avoided.

Examples of pressure surfaces includes plates and forms.

It is preferred according to the invention to use a relatively high surface pressure, since the fixation becomes better during the cooling. As an example, a pressure of 0.1–20 N/mm$^2$ can be used.

A high surface pressure on the composite material during the cooling will result in improved material properties, both with respect to the form stability and the performance. Just as shrinkage in the flow direction in the continuous process is reduced, the use of a pressure plate also holds the composite material in its longitudinal direction during the cooling.

In even a further embodiment, the composite material is cooled under a substantially uniform pressure over the surface by a cooling surface. Such an embodiment can obtain a composite material having uniform shrinkage properties over the entire surface.

In yet another embodiment, the product comprises at least one foil layer of PTFE or ePTFE foil and at least one layer of reinforcing woven material. Such an embodiment achieves a product possessing a high E-modulus and other advantageous material properties.

A further advantage of a composite product as mentioned above is that the edge properties become considerably improved, as the shrinkage is reduced in particular materials. For example, a layer of PTFE foil laminated without the use of the present invention would have a tendency to curl or "wrinkle" at the edges of the composite product. This disadvantage is partly equalized by the improvement of the shrinkage properties, that is less shrinkage. Similarly, the fixation of the composite during the cooling improves the resulting form stability in the product—and thereby also in the edge sections.

In a further embodiment, the reinforcing woven material consists at least partly of glass fibre fabric or PTFE coated glass fibre fabric. Such an embodiment achieves particular advantageous results. The invention has proven itself particular advantageous with respect to the relatively high sensibility compared with a laminated PTFE foil. It has proven possible to produce composite products, e.g. discrete components, endless webs of the composite etc., without the dimensions of the final products diverting substantially from the original form of the composite in its non-final state.

Under all circumstances it is possible according to the invention to obtain a larger degree of predictability with respect to the shrinkage.

BRIEF DESCRIPTION OF THE DRAWINGS

In the following, the invention is further described with reference to the drawings, where.

DETAILED DESCRIPTION OF THE INVENTION

Figure 1:
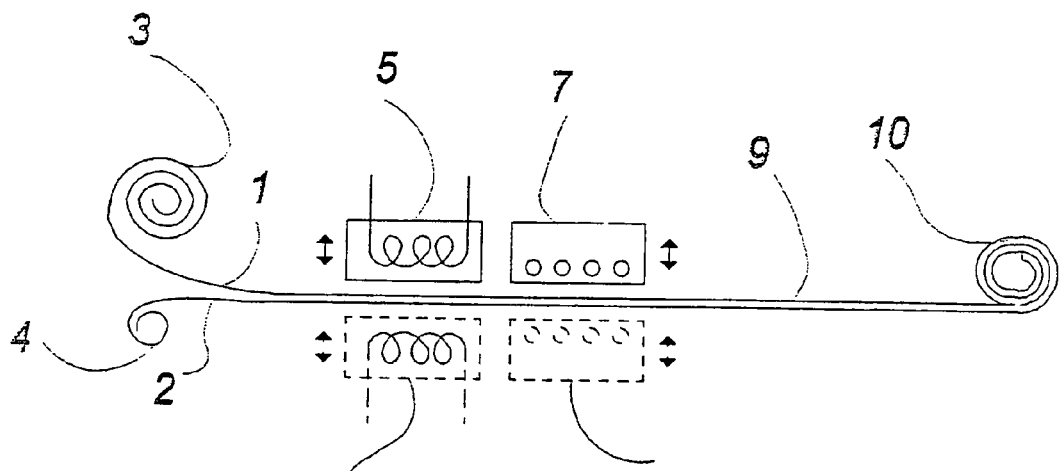
FIG. 1 shows a preferred embodiment of the invention, and where.

In FIG. 1 a schematic view of a preferred automated embodiment according to the invention is shown.

In this embodiment, the apparatus is fed by endless webs of PTFE foil 1 and PTFE coated glass fibre fabric 2 from a roll of PTFE foil 3 and a roll of PTFE coated glass fibre fabric 4. The finished composite 9 is wound up on a roll 10.

According to this embodiment the webs 1 and 2 move relative to the apparatus. The rollers 3, 4 and 10 are rotated by forwarding means (not shown in FIG. 1) in an intermittent movement between two cooperating heated pressure surfaces 5 and 6. These pressure surfaces 5, 6 are connected to hydraulic pressure- and movement means (not shown in FIG. 1) and adapted to perform a relative movement to and from the two webs 1 and 2.

The above stepwise movement in the longitudinal direction essentially corresponds to the pressure surfaces 5, 6.

When the stepwise movement has fed two new partial lengths of foil 1 and glass fabric 2 in between the pressure surfaces 5, 6, the pressure plates 5, 6 will move against the webs and perform a combined pressure and heat treatment so that the foil 1 and the glass fabric is joined together in a lamination.

According to this embodiment, the foil and the glass fabric is heated to a temperature of approx. 380° C.–400° C. under a pressure of 0.1–20 N/mm$^2$.

When the lamination is completed the pressure surfaces 5, 6 are moved away from each other and the now laminated composite is moved intermittently between two cooperating pressure surfaces 7, 8, which are provided with cooling means.

The cooling means will, over a time period of 20–120 seconds, cool the composite to a temperature of about 50° C. and apply a pressure of 0.1–20 N/mm$^2$.

When the lamination of the partial length is completed the pressure surfaces are moved apart and the composite web is rolled up on a roll (10).

It is understood that the above described process is a continuous process where cooling of a partial length is carried out simultaneous with the heating of the preceding partial length.

It is moreover understood that the different process parameters can be adjusted and optimized to the properties and thickness of the chosen materials.

It is thus within the scope of the invention to vary the temperature and the time intervals with respect to the applied materials and the wanted result.

It is also understood that the composite could be made by multiple laminations of glass fibre fabric layers until the desired thickness and material properties are achieved.

Figure 2:
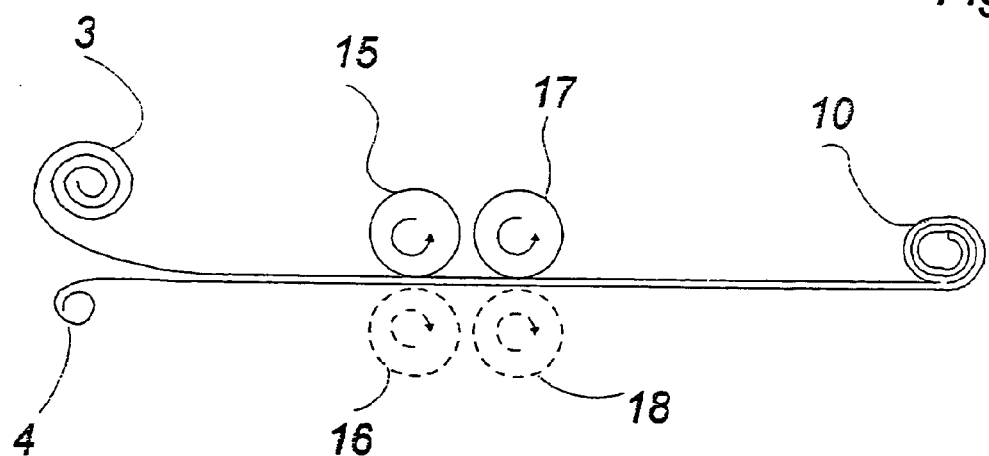
FIG. 2 shows a further embodiment of the invention.

In FIG. 2 a further embodiment of the invention is shown.

In this embodiment the apparatus is fed by endless webs of PTFE foil 1 and a PTFE coated glass fibre fabric 2 from a roll of PTFE foil 3 and a roll of PTFE coated glass fibre fabric 4. The finished composite 9 is wound up on a roll 10.

According to this embodiment the webs 1 and 2 move relative to the apparatus. The rollers 3, 4 and 10, are rotated by means of forwarding means (not shown in FIG. 2) in a continuous movement in between two cooperating heated pressure surfaces in the shape of rollers 15 and 16. These rollers 15, 16 are connected to pressure means (not shown in FIG. 2).

When the continuous movement has fed the two new partial lengths of the foil 1 and the glass fabric 2 in between the pressure rollers 15, 16, the pressure rollers are moved relative to the webs and apply a combined pressure and heat impact so that the foil 1 and the glass fibre fabric are joined together in a lamination in a continuous movement.

When the relevant part of webs have been moved away from the rollers they are laminated and are forwarded in between two cooperating pressure surfaces 17, 18 that are provided with cooling means.

The cooling means will, over a time period of e.g. 0.1 seconds, cool the composite to a temperature of about 50° C. whilst under pressure.

The composite is finally wound up on the roll 10.

It is understood that many different types of apparatuses can be designed for the performance of the invention.

As an example thereof, it can be mentioned, that the corresponding pressure surface arrangement displayed in dotted lines could be omitted.

I claim:

1. A method of manufacture of a composite product comprising at least one layer of reinforcing woven material and at least one layer of PTFE foil or ePTFE foil comprising the steps of:

laminating said at least one layer of foil together with said at least one layer of woven material by heat and pressure, to form a laminated foil and woven material having a partial length and a preceding partial length, wherein said laminating is carried out at approximately 380° C. to 400° C. under a pressure of 0.1 to 20 N/mm$^2$; and cooling said laminated foil and woven material in a fully or partly fixed state, wherein said laminated foil and woven material is cooled under pressure, from about 300 to 420° C. to about 50° C. in about 0.1 to 240 seconds, wherein said laminating and cooling is conducted continuously whereby cooling of said partial length of said laminated foil and woven material is carried out simultaneously with the heating of said preceding partial length of said laminated foil and woven material.

2. A method according to claim 1, wherein said laminated foil and woven material is cooled from about 380 to 400° C. to about 50° C. in about 20 to 120 seconds.

3. A method according to claim 1, wherein the laminated foil and woven material is subject to a tension during cooling.

4. A method according to claim 1, further comprising applying pressure to the laminated foil and woven material by means for pressure application.

5. A method according to claim 4, wherein the means for pressure application is provided with cooling means.

6. A method according to claim 4, wherein the pressure is applied continuously by at least one roller.

7. A method according to claim 4, wherein the pressure is applied intermittently by a pressure surface.

8. A method according to claim 1, wherein the laminated foil and woven material is cooled by a substantially uniform pressure on the surface.

9. The method of claim 1, wherein said cooling is carried out at a pressure of from 0.1 to 20 N/mm$^2$.

* * * * *